Patented Feb. 13, 1934

1,947,359

UNITED STATES PATENT OFFICE 1,947,359

DEWAXING PETROLEUM OILS

Ernest W. Reid, Pittsburgh, Pa., assignor to Carbide and Carbon Chemicals Corporation, a corporation of New York No Drawing. Application April 2, 1931
Serial No. 527,343

5 Claims. (Cl. 196—19)

The invention is a process for separating hydrocarbon material into fractions by the use of a selective solvent, the latter being contacted with the material to be separated at a relatively high temperature so that a solution will be formed; and the solution then being cooled with the precipitation of a part of the dissolved material. The precipitate can be recovered by decantation, or any suitable form of filtration, and the material which remains dissolved can be recovered by distillation or other means.

The process of the invention is particularly applicable to and will be described in connection with the separation of solid paraffin waxes from the hydrocarbon material associated with these waxes in petroleum distillates and bottoms, but it will be understood that the process can also be used for refining paraffin waxes by removing normally liquid hydrocarbons therefrom; for separating waxes and petrolatums of different solubilities; and for other purposes.

The dewaxing of petroleum distillates and bottoms by the use of selective solvents has received much study in recent years. The primary object of such processes may be the recovery of the wax; but it usually is the preparation of lubricating oil of improved quality, characterized by relatively low chill point, low pour point, and relatively little change in viscosity over the temperature range to which it may be subjected in use. Many selective solvents have been proposed, including acetone and other ketones, and isopropyl and secondary butyl alcohols.

The desired qualities in a selective solvent for the purpose under discussion are that it shall, at high temperatures, have a high solvent power for all the hydrocarbon materials involved; that its solvent power for the material which is to be precipitated shall diminish rapidly as the temperture is lowered; that its solvent power for the material which is to remain dissolved shall vary as little as possible with temperature; and that it shall be easy to separate from the material which remains dissolved. Isopropyl ether

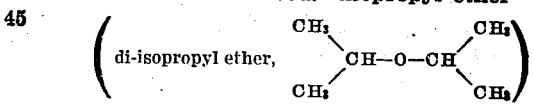

is well adapted to these requirements. It has a boiling point of 67.5° C.; is a good solvent for oil and wax at temperatures above 30° C.; and has little solvent action on the wax at temperatures near 0° C. While it can be used alone, it may be admixed with other solvents, such as isopropyl alcohol, acetone, 1,4 dioxane or isopropyl-acetate.

*Example.*—Thirty gallons of wax distillate was dissolved in 60 gallons of isopropyl ether and 40 gallons of acetone, and the solution cooled to about 1° C. The precipitated wax, after settling, was filtered off, washed with a small quantity of cold solvent, and dried. The wax obtained was free from oil, and in the form of particles of a size conducive to easy filtration. The solvent was recovered by distillation, leaving behind an oil of lubricating grade.

In employing the invention under such conditions as those described above, the pour point of the oil obtained is substantially the same as the temperature at which the wax is separated. Thus in the foregoing example, the oil had a pour point near 0° C. With many other selective solvents which have been proposed, the wax must be separated at a temperature 20° or more below the pour point desired.

I claim:

1. The method of separating normally solid hydrocarbon material from mixtures which also contain normally liquid hydrocarbon material which comprises dissolving said mixture in a solvent comprising isopropyl ether; cooling the solution to precipitate the normally solid hydrocarbon material; and separating the precipitated material.

2. The method of dewaxing petroleum oils by means of a selective solvent which comprises dissolving said oil in a solvent containing isopropyl ether; cooling the solution to precipitate the wax; and separating the wax from the solution.

3. The method of dewaxing petroleum oils by means of a selective solvent which comprises dissolving said oil in a solvent containing isopropyl ether and acetone; cooling the solution to precipitate the wax; and separating the wax from the solution.

4. The method of dewaxing petroleum oils to produce oils having a pour point of about 0° C. which comprises dissolving said oil in a solvent containing isopropyl ether and acetone; cooling the solution to about 0° C. to precipitate the wax; and separating the wax from the solution.

5. The method of dewaxing petroleum oils which comprises dissolving said oil in a solvent comprising isopropyl ether and acetone in the proportion of about 60 parts to about 40 parts by volume; cooling the solution to precipitate the wax; and separating the wax from the solution.

ERNEST W. REID.